United States Patent
Lohwasser et al.

(10) Patent No.: US 6,548,108 B1
(45) Date of Patent: Apr. 15, 2003

(54) PROCESS FOR MANUFACTURING PACKAGING FILM

(75) Inventors: Wolfgang Lohwasser, Gailingen (DE); Olaf Frei, Siblingen (CH); Olivier Y. Muggli, Louisville, KY (US)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/819,088

(22) Filed: Dec. 1, 1999

Related U.S. Application Data

(62) Division of application No. 08/963,266, filed on Nov. 3, 1997, now Pat. No. 6,027,793.

(51) Int. Cl.⁷ .................................................. B05D 5/06
(52) U.S. Cl. ................... 427/162; 427/255.37; 427/535
(58) Field of Search ..................... 427/162, 255.28, 427/255.37, 535, 294

(56) References Cited

U.S. PATENT DOCUMENTS

| | | | |
|---|---|---|---|
| 3,442,686 A | | 5/1969 | Jones |
| 4,493,872 A | * | 1/1985 | Funderburk et al. ........ 427/250 |
| 5,100,720 A | | 3/1992 | Sawada et al. |
| 5,508,075 A | | 4/1996 | Roulin et al. |
| 5,641,559 A | | 6/1997 | Namiki |
| 5,763,088 A | | 6/1998 | Nakano et al. |
| 5,770,301 A | * | 6/1998 | Murai et al. ................. 427/387 |
| 5,948,484 A | * | 9/1999 | Gudimenko et al. ........ 427/489 |
| 6,277,496 B1 | * | 8/2001 | Lohwasser et al. ......... 427/405 |

FOREIGN PATENT DOCUMENTS

| | | |
|---|---|---|
| EP | 0549528 | 12/1992 |
| EP | 0622399 | 4/1994 |
| FR | 2712310 | 11/1993 |

OTHER PUBLICATIONS

*Von Klaus Maschig*, "Verpackungstechnik: neue Materialien Weich und glasig," vol. 82, No. 36 (Sep. 30, 1990), pp. 64 to 67, (Maschig).

Chemical Abstracts, vol. 86, No. 26, (Jun. 27, 1977), abstract No. 191013q.

* cited by examiner

*Primary Examiner*—Bret Chen
(74) *Attorney, Agent, or Firm*—Fisher, Christen & Sabol

(57) ABSTRACT

A process for manufacturing a packaging film that is transparent to UV light and has a barrier action against water vapor and gases. The packaging film includes a substrate film of a polyolefin or polyamide with a ceramic coating layer of $SiO_x$, where x is a number from 1.5 to 1.8. The thickness of the ceramic coating layer is 10 nm to 2 µm. The ceramic coating layer of $SiO_x$ is deposited onto the polyolefin or polyamide substrate film using a vacuum thin film deposition process by depositing silicon oxide ($SiO_2$) and elementary silicon (Si) simultaneously in vacuum.

29 Claims, No Drawings

PROCESS FOR MANUFACTURING PACKAGING FILM

This is a division of U.S. Ser. No. 08/963,266, filed on Nov. 3, 1997, now U.S. Pat. No. 6,027,793, issued on Feb. 22, 2000.

BACKGROUND OF THE INVENTION

1. Field of the Invention

The invention relates to a packaging film which is transparent to UV light and has a barrier action against water vapor and gases. Within the scope of the invention is also a process and a use of such a packaging film.

2. Background of the Invention

The sterilization of transparent products by radiation with UV light is known. It is used today, e.g., for decontaminating drinking water. It is also known that the storage time of natural untreated foodstuffs can be extended if these are radiated with UV light. The UV rays have a decontaminating action only on the surface of a foodstuff. An essentially, untreated foodstuff is however sterile on the inside, so that the radiation of the surface is sufficient for decontamination purposes.

In order to keep a product sterile, it is appropriate to perform the sterilization of the foodstuff while it is in the packaging; this way it is not possible for the contents subsequently to some into contact with non-sterile surfaces.

The packaging materials that are known today and are used for packaging foodstuffs either have no adequate barrier action against water vapor or oxygen, or are not transparent to UV radiation. Especially when employing very high energy (short wave) UV light, as is supplied, e.g., by excimer lamps, the choice of possible packaging materials is very limited. For example, among others, polyethylene-terephthalate (PET) cannot be used because of its absorption edge at 330 to 350 nm, nor polyvinylidenchloride (PVDC). The choice of possible packaging materials that are transparent to UV light is limited therefore to polyamides (PA) and polymers and copolymers of ethyl vinyl alcohol (EVOH). Often, however, it is not possible to achieve adequate barrier values against water vapor. The barrier against gases and aromas is also often not sufficient.

It has already been found that the barrier properties of plastics can be improved in some cases by thin film vacuum deposition of $SiO_x$ or aluminum oxide coatings using methods such as PVD (physical vapor deposition) or by CVD (chemical vapor deposition). However, the processes and coatings used up to now have yielded substantial improvements with respect to the barrier action against water vapor and gases only with PET or the layers known to date are discolored, i.e., yellowish or grayish and consequently have high absorption in the UV range.

DESCRIPTION OF THE INVENTION

The object of the present invention is therefore to provide a packaging film of the kind described at the start which is both transparent to UV light and exhibits excellent barrier properties with respect to water vapor and gases.

That objective is achieved by way of the invention in that the packaging material features a substrate film of a polyolefin or polyamide with a ceramic coating of $SiO_x$, where x is a number from 1.5 to 2 and the thickness of the ceramic layer is 10 nn (nanometer) to 2 μm.

The coating of a known UV-transparent substrate film with a ceramic layer of $SiO_x$ having a composition and thickness according to the invention results in a packaging material which, apart from good transparency for UV radiation, exhibits excellent barrier properties with respect to water vapor and gases.

The substrate film is preferably an oriented polypropylene (oPP) film, advantageously an. oPP film with a 0.5 to 2 μm thick outer layer of a copolymer of polyethylene (PE)/polypropylene (PP) comprising 1 to 20% PE, in particular 2 to 5% PE. This variant provides excellent barrier properties with respect to water vapor combined with very good barrier properties with respect to oxygen.

Plasma pre-treatment of the substrate film before coating with $SiO_x$ provides a further improvement in the barrier properties with respect to water vapor and oxygen.

A further version of a substrate film is an oriented polypropylene film (oPP) with a 0.5 to 2 μm thick outer layer of polymers or copolymers of ethylvinyl alcohol (EVOH). If a polyamide film is employed as the substrate film, then this is preferably a biaxially stretched oriented polyamide film (oPA).

The substrate film coated with $SiO_x$ can in principle be used directly as packaging material. In order to control the sealing properties, however, the substrate film may be coated on one or both sides with UV transparent sealing layers, e.g., of PP or PE. The coating takes place preferably using a laminating adhesive based on polyurethane. Laminating with further UV transparent layers such as oPA may be used as a means of improving the mechanical properties. The mentioned further UV transparent layers which may be laminated with the $SiO_x$ coated substrate layer to form packaging materials with different properties with respect to mechanical strength and sealing capacity, must not contain any aromatic carbohydrates. For that reason, aliphatic systems which exhibit optimal UV transparency are preferred.

The ceramic layers with $SiO_x$ may be deposited on the film, e.g., using vacuum thin film techniques, preferably by electron beam vaporization.

According to the invention a 10 nm to 2 μm thick ceramic layer of $SiO_x$ is deposited onto a polyolefin or polyamide substrate film using a generally known vacuum thin film deposition process by depositing silicon oxide ($SiO_2$) and metallic silicon (Si) simultaneously in vacuum, where the value x is a number from 1.5 to 2, preferably 1.5 to 1.9 and in particular 1.5 to 1.8. The amount of $SiO_2$ to Si is preferably adjusted in such a way that, stoichiometrically, a deficit of 10 to 30% oxygen—with reference to the pure oxide—results in the evaporated material.

The vaporization of $SiO_2$ and Si occurs preferably simultaneously from a common vaporization source, i.e., from a mixture of $SiO_2$ and Si.

As materials to be evaporated, further additives such as $Al_2O_3$, $B_2O_3$ and $M_gO$ may be added to the $SiO_2$ in amounts up to 50 mol %, preferably 5 to 30 mol %, in each case with reference to $SiO_2$.

Further additions that may be made to the materials to be evaporated are, e.g., Al, B and/or Mg in pure form or as Si alloy, in amounts up to 50 mol %, preferably 5 to 30 mol %, in each case with reference to Si.

The ratio of $SiO_2$, $Al_2O_3$, $B_2O_3$ and $M_gO$ to Si, Al, B and Mg is adjusted, e.g., such that there is a stoichiometric deficit of 10 to 30% oxygen, with reference to the sum of the pure oxides in the evaporated material.

The coating process is controlled via the rate of vaporization of the material to be vaporized, the rate of deposition on the substrate and the duration of exposure of the substrate to the vacuum chamber atmosphere, in such a manner that a $SiO_2$ coating having a thickness of 10 nm to 2 μm, preferably 30 nm to 1 μm, and in particular 40 nm to 100 nm is obtained.

The $SiO_x$ coated substrate film may, as mentioned above, be provided on one or both sides with further UV transparent layers. The deposition of these additional layers may be performed, e.g., by laminating or using laminating adhesive.

The packaging material according to the invention is suitable in particular for manufacturing flexible packaging such as pouches and as lid material for sealing onto containers.

A particularly suitable field of application is in the use of the packaging material according to the invention for packaging basic and luxury foodstuffs that are sterilized in the packages condition by radiation with UV light.

The superiority of the packaging material according to the invention over the present day, conventional materials—with respect to UV transparency and barrier action against water vapor and gases—is supported by the following table showing measured values of the above mentioned properties.

|   | Oxygen barrier [cm$^3$/ (m$^2$24 h bar)] at 25° C. 50% rH | Water vapour barrier [g/m$^2$24 h)] at 25° C. 50% rH | UV-transmission [%] at 251 nm |
|---|---|---|---|
| 1 oPA (15 μm)//PE (50 μm) | 40 | 2 | 72 |
| 2 oPA (15 μm)/SiO$_x$/ PE (50 μm) | 0.2 | 0.4 | 65% |
| 3 oPP (20 μm)//PE (50 μm) | 1800 | 1.0 | 79% |
| 4 oPP (20 μm)/SiO$_x$// PE (50 μm) | 3.0 | 0.1 | 75% |
| 5 PET (12 μm)//PE (50 μm) | 119 | 3 | 0% |
| 6 oPA-PVDC | 2.5 | 0.3 | 5% |

Versions 2 and 4 according to the invention show both excellent UV transparency and good barrier action against water vapor and oxygen. The version 1, 3, 5 and 6 not within the range covered by the invention exhibit considerably poorer properties at least with respect to those required.

What is claimed is:

1. A process for manufacturing a packaging film that is transparent to UV light and has a barrier action against water vapor and gases, the packaging film includes a substrate film of a polyolefin or polyamide with a ceramic coating layer of $SiO_x$, where x is a number from 1.5 to 1.8, the thickness of the ceramic coating layer is 10 nm to 2 μm, the ceramic coating layer of $SiO_x$ is deposited onto the polyolefin or polyamide substrate film using a vacuum thin film deposition process by depositing silicon oxide ($SiO_2$) and elementary silicon (Si) simultaneously in vacuum.

2. The process according to claim 1, wherein $SiO_2$ and Si are vaporized together as a mixture.

3. The process according to claim 2, wherein $Al_2O_3$, $B_2O_3$ and/or MgO in an amount up to 50 mol percent, with reference to the $SiO_2$, are simultaneously in vacuum deposited with said $SiO_2$ and said Si.

4. The process according to claim 3, wherein the amount of said $Al_2O_3$, $B_2O_3$ and/or MgO is 5 to 30 mol percent, with reference to the $SiO_2$.

5. The process according to claim 3, wherein, prior to the $SiO_x$ coating, the substrate is subjected to a plasma pretreatment.

6. The process according to claim 3, wherein, the amount of $SiO_2$ to Si is adjusted such that, stoichiometrically, a deficit of 10 to 30 percent of oxygen, with reference to the $SiO_2$, results in said $SiO_x$.

7. The process according to claim 3, wherein Al, B and/or Mg in pure form or as Si alloy, in an amount up to 50 mol percent, with reference to Si, are simultaneously in vacuum deposited with said $SiO_2$ and said Si.

8. The process according to claim 7, wherein the amount of said Al, B and/or Mg in pure form or as Si alloy is 5 to 30 mol percent, with reference to the Si.

9. The process according to claim 7, wherein the ratio of $SiO_2$, $Al_2O_3$, $B_2O_3$ and/or MgO to Si and Al, B and/or Mg is adjusted such that there is a stoichiometric deficit of 10 to 30 percent oxygen, with reference to the sum of the $SiO_2$ and $Al_2O_3$, $B_2O_3$ and/or MgO.

10. The process according to claim 9, wherein, prior to the $SiO_x$ coating, the substrate is subjected to a plasma pretreatment.

11. The process according to claim 2, wherein Al, B and/or Mg in pure form or as Si alloy, in an amount up to 50 mol percent, with reference to Si, are simultaneously in vacuum deposited with said $SiO_2$ and said Si.

12. The process according to claim 11, wherein the amount of said Al, B and/or Mg in pure form or as Si alloy is 5 to 30 mol percent, with reference to the Si.

13. The process according to claim wherein, prior to the $SiO_x$ coating, the substrate is subjected to a plasma pretreatment.

14. The process according to claim 1, wherein $Al_2O_3$, $B_2O_3$ and/or MgO in an amount up to 50 mol percent, with reference to the $SiO_2$, are simultaneously in vacuum deposited with said $SiO_2$ and said Si.

15. The process according to claim 14, wherein the amount of said $Al_2O_3$, $B_2O_3$ and/or MgO is 5 to 30 mol percent, with reference to the $SiO_2$.

16. The process according to claim 14, wherein, prior to the $SiO_x$ coating, the substrate is subjected to a plasma pretreatment.

17. The process according to claim 14, wherein the amount of $SiO_2$ to Si is adjusted such that stoichiometrically, a deficit of 10 to 30 percent of oxygen with reference to the $SiO_2$, results in said $SiO_x$.

18. The process according to claim 14, wherein Al, B and/or Mg in pure form or as Si alloy, in an amount up to 50 mol percent, with reference to the Si, are simultaneously in vacuum deposited with said $SiO_2$ and said Si.

19. The process according to claim 18, wherein the amount of said Al, B and/or Mg in pure form or as Si alloy is 5 to 30 mol percent, with reference to the Si.

20. The process according to claim 19, wherein, prior to the $SiO_x$ coating, the substrate is subjected to a plasma pretreatment.

21. The process according to claim 18, wherein the ratio of $SiO_2$, and $Al_2O_3$, $B_2O_3$ and/or MgO to Si and Al, B and/or Mg is adjusted such that there is a stoichiometric deficit of 10 to 30 percent oxygen, with reference to the sum of the $SiO_2$ and $Al_2O_3$, $B_2O_3$ and/or MgO.

22. The process according to claim 1, wherein Al, B and/or Mg in pure form or as Si alloy, in an amount up to 50 mol percent, with reference to Si, are simultaneously in vacuum deposited with said $SiO_2$ and said Si.

23. The process according to claim 22, wherein the amount of said Al, B and/or Mg in pure form or as Si alloy is 5 to 30 mol percent, with reference to the Si.

24. The process according to claim 22, wherein prior to the $SiO_x$ coating, the substrate is subjected to a plasma pretreatment.

25. The process according to claim 1, wherein the amount of $SiO_2$ to Si is adjusted such that, stoichiometrically, a deficit of 10 to 30 percent of oxygen, with reference to the $SiO_2$, results in said $SiO_x$.

26. The process according to claim 25, wherein, prior to $SiO_x$ coating, the substrate film is subjected to a plasma pretreatment.

27. The process according to claim 1, wherein, prior to $SiO_x$ coating, the substrate film is subjected to a plasma pretreatment.

28. A process for manufacturing a packaging film that is transparent to UV light and has a barrier action against water vapor and gases, the packaging film includes a substrate film of a polyolefin or polyamide with a ceramic coating layer of $SiO_x$, where x is a number from 1.5 to 1.8, the thickness of the ceramic coating layer is 10 nm to 2 μm, the ceramic coating layer of $SiO_x$ is deposited onto the polyolefin or polyamide substrate film using a vacuum thin film deposition process by depositing silicon oxide ($SiO_2$) and elementary silicon (Si) simultaneously in vacuum in a proportion which provides said $SiO_x$.

29. A process for manufacturing a packaging film that is transparent to UV light and has a barrier action against water vapor and gases, the packaging film includes a substrate film of a polyolefin or polyamide with a ceramic coating layer of $SiO_x$, where x is a number from 1.5 to 1.8, the thickness of the ceramic coating layer is 10 nm to 2 μm, the ceramic coating layer of $SiO_x$ is deposited onto the polyolefin or polyamide substrate film using a vacuum thin film deposition process by simultaneous evaporation in vacuum of silicon oxide ($SiO_2$) and elementary silicon (Si) in proportion such that equilibrium composition of the $SiO_2$ and Si in vapor phase corresponds to $SiO_x$.

* * * * *